United States Patent
Jackson et al.

[11] Patent Number: 6,085,325
[45] Date of Patent: *Jul. 4, 2000

[54] METHOD AND APPARATUS FOR SUPPORTING POWER CONSERVATION OPERATION MODES

[75] Inventors: David R. Jackson, Hillsboro; Leonard W. Cross; Robert A. Jacobs, both of Portland; Ali S. Oztaskin, Beaverton, all of Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/766,089

[22] Filed: Dec. 16, 1996

[51] Int. Cl.⁷ .............................. G06F 1/26; G06F 1/28
[52] U.S. Cl. .................... 713/300; 713/310; 713/320; 713/322; 713/323; 713/330; 713/500; 713/600; 710/266; 365/222; 365/227
[58] Field of Search .................... 395/750.01, 750.3, 395/750.04; 327/292; 331/46, 18, 74; 364/707; 713/300, 320, 322, 310, 323, 330, 500, 600; 710/266; 365/222, 227

[56] References Cited

U.S. PATENT DOCUMENTS

| | | | |
|---|---|---|---|
| 5,155,840 | 10/1992 | Niijima | 395/550 |
| 5,222,239 | 6/1993 | Rosch | 395/750 |
| 5,237,699 | 8/1993 | Little et al. | 395/750 |
| 5,388,265 | 2/1995 | Volk | 395/750 |
| 5,396,635 | 3/1995 | Fung . | |
| 5,414,745 | 5/1995 | Lowe | 377/114 |
| 5,454,114 | 9/1995 | Yach et al. | 395/750 |
| 5,493,684 | 2/1996 | Gephardt et al. | 395/750 |
| 5,502,689 | 3/1996 | Peterson et al. | 368/156 |
| 5,511,203 | 4/1996 | Wisor et al. | 395/750 |
| 5,560,022 | 9/1996 | Dunstan et al. | 713/300 |
| 5,560,024 | 9/1996 | Harper et al. | 395/750 |
| 5,603,038 | 2/1997 | Crump et al. | 395/750 |
| 5,628,020 | 5/1997 | O'Brien | 395/750 |
| 5,633,831 | 5/1997 | Tsukude et al. | 365/222 |
| 5,638,542 | 6/1997 | Nikjou | 395/750 |
| 5,675,808 | 10/1997 | Gulick et al. | 395/750 |
| 5,708,820 | 1/1998 | Park et al. | 395/750 |
| 5,710,929 | 1/1998 | Fung | 395/750 |
| 5,754,837 | 5/1998 | Walsh et al. | 713/500 |
| 5,758,174 | 5/1998 | Crump et al. | 713/323 |
| 5,765,004 | 6/1998 | Foster et al. | 713/323 |
| 5,781,780 | 7/1998 | Walsh et al. | 395/750.01 |
| 5,787,297 | 7/1998 | Lin | 395/750.04 |

*Primary Examiner*—Ayaz R. Sheikh
*Assistant Examiner*—Frantz Blanchard Jean
*Attorney, Agent, or Firm*—Blakely, Sokoloff, Taylor & Zafman LLP

[57] ABSTRACT

An apparatus for managing power in an electronic device that receives the power from a bus is described. The apparatus comprises a clock enable circuit that disables a clock that generates nominal clock frequencies derived from raw frequencies output by an oscillator upon receiving a first signal. A time-wise independent time reference circuit is coupled to the clock enable circuit. The time-wise independent time reference circuit sends the first signal to the clock enable circuit a first predetermined period of time after receiving a signal to enter into a suspend state.

9 Claims, 8 Drawing Sheets

METHOD AND APPARATUS FOR SUPPORTING POWER CONSERVATION OPERATION MODES

FIELD OF THE INVENTION

The present invention pertains to the field of power management for electronic devices. More specifically, the present invention relates to an apparatus and method for providing low power operation modes for electronic devices receiving power from a bus in a computer system.

BACKGROUND OF THE INVENTION

The Universal Serial Bus (USB) connects USB devices with a USB host. The host contains a controller which manages the operation of each USB device in the system. There is one host on each USB system. The USB physical interconnect is a tiered star topology. A hub is at the center of each star. Each wire segment is a point-to-point connection between the host and a hub or a USB device, or a hub connected to another hub or USB device. FIG. 1 illustrates the topology of the USB.

The USB transfers signals and power over a four wire cable. Two wires are designated for carrying signals from point-to-point segments. A voltage wire and a ground wire are designated in the USB cable for delivering power to USB devices. The voltage wire, VBus, is nominally 5 volts at the source. Each USB segment provides a limited amount of power over the cable. The host supplies power for use by USB devices that are directly connected. A USB host has a power management system which is independent of the USB. USB system software interacts with the host's power management system to handle system power events such as the suspend or resume modes which help with power conservation in the USB system.

The suspend mode is a power saving state which a USB device enters when the USB device sees a constant idle state on its bus lines for more than a predetermined amount of time, e.g., 3.0 milliseconds. The resume mode is used by the host or a device to awake the USB device in the suspend state. A USB device supporting the suspend and resume mode operations must comply with a number of requirements. First, the USB device must draw less than a predetermined amount of current, presently 500 micro amps from the USB when operating in the suspend state. One approach to meeting this power constraint is achieved by powering down the clock and oscillator on the USB device when in the suspend state. Second, before powering down the clock and oscillator on the USB device, a sufficient amount of time needs to be allocated to the USB device to store current USB device state information in memory. This allows the USB device to return to the same state when it exits the suspend state. Third, when the USB device wakes-up by resume signaling, the oscillator must be given sufficient time to stabilize before enabling the clock to derive nominal frequencies from the oscillator. This prevents the clock from generating clock pulses with unstable frequencies. Fourth, sufficient time needs to be allocated to the USB device to write the stored USB device state operation into its registers before exiting the resume state and beginning normal operation.

Thus, a method and apparatus is needed for supporting power conservation modes in a device receiving power from a bus in a computer system.

SUMMARY OF THE INVENTION

According to one aspect of the invention, an apparatus for managing power in a device is described. The apparatus comprises a clock enable circuit that disables a clock that generates nominal clock frequencies derived from raw frequencies output by an oscillator upon receiving a first signal. A time-wise independent time reference circuit is coupled to the clock enable circuit. The time-wise independent time reference circuit sends the first signal to the clock enable circuit a first predetermined period of time after receiving a second signal to enter into a suspend state.

According to another aspect of the invention an apparatus for managing power in a device operating with an oscillator and a clock deriving nominal frequencies from the oscillator is described. The apparatus comprises a bus monitoring circuit that monitors activity on a bus. The bus monitoring circuit sends an activity signal to a microcontroller on the device when activity is detected. An oscillator enable circuit is coupled to the bus monitoring circuit. The oscillator enable circuit activates the oscillator upon receiving a resume signal. A time reference circuit generates a clock enable signal a predetermined period of time after receiving the resume signal, wherein the time reference circuit operates at a time-wise independent manner relative to the oscillator and the clock. A clock enable circuit is coupled to the time reference circuit. The clock enable circuit enables the clock. The clock enable circuit disables the clock upon receiving the first signal.

According to a further aspect of the invention, a method is described for exiting a power saving mode for an electronic device powered by a bus and operating with an oscillator and a clock deriving nominal frequencies from the oscillator. According to the method, a signal to resume activity is received. The oscillator is enabled. A first predetermined period of time after the oscillator is enabled is measured, wherein the measuring is performed in a time-wise independent manner relative to the oscillator or the clock. The clock is enabled after the first predetermined period of time.

BRIEF DESCRIPTION OF THE DRAWINGS

The present invention is illustrated by way of example and not by way of limitation in the figures of the accompanying drawings, in which like references indicate similar elements and in which.

DETAILED DESCRIPTION

Figure 1:
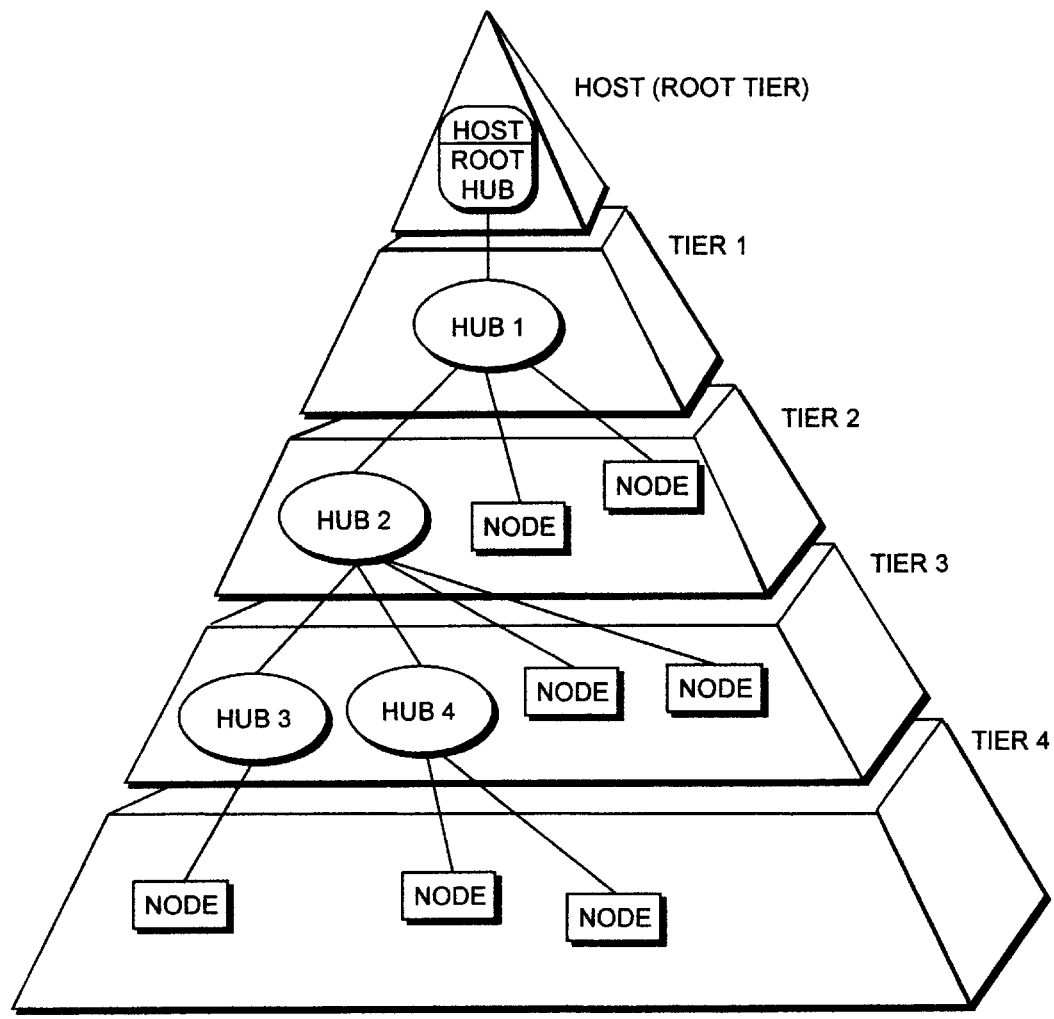
FIG. 1 illustrates the topology of the Universal Serial Bus.
Figure 2:
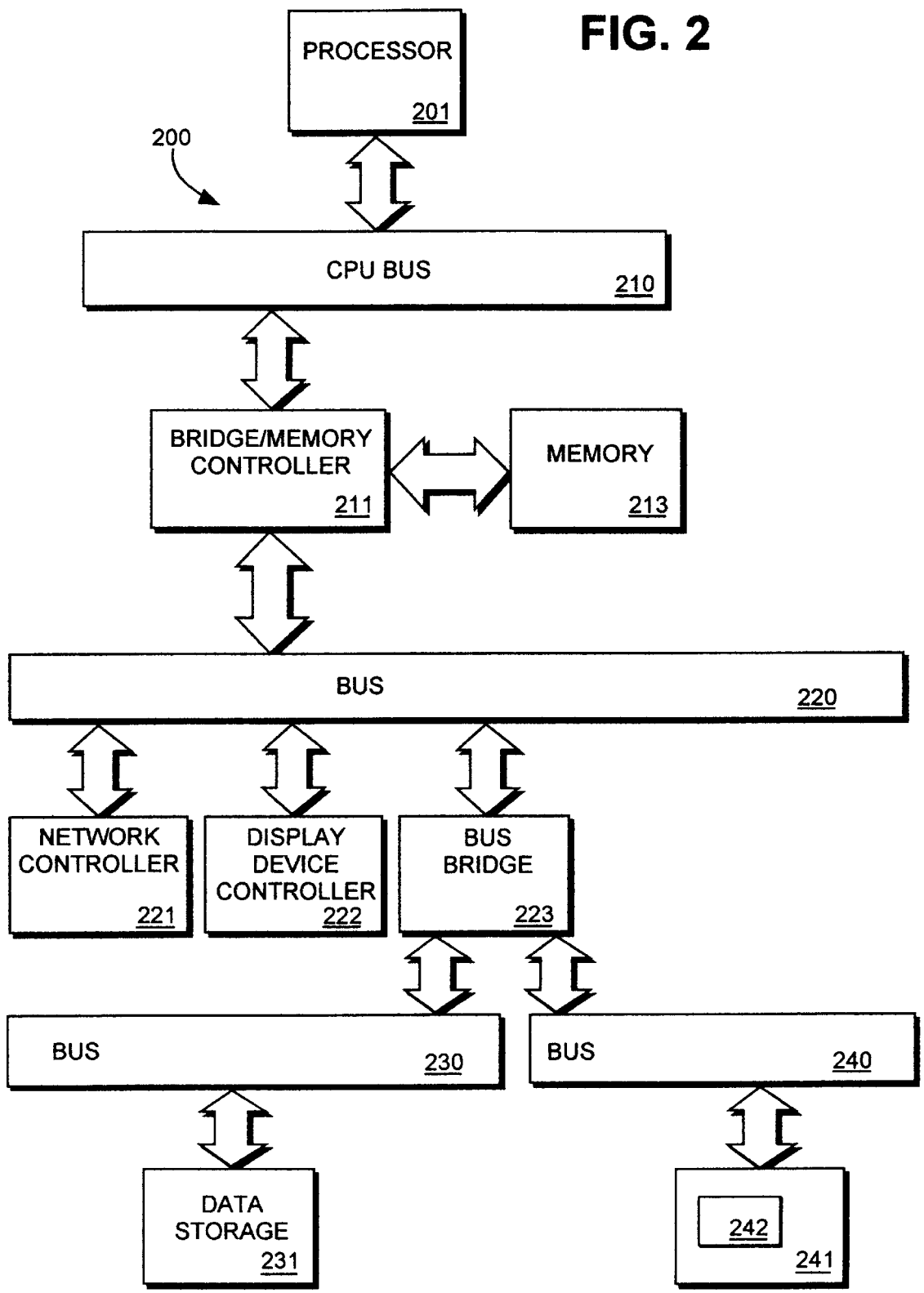
FIG. 2 illustrates a block diagram of a computer system implementing one embodiment of the present invention.

Referring to FIG. 2, an exemplary computer system upon which an embodiment of the present invention can be implemented is shown as 200. The computer system 200 comprises a processor 201 that processes digital data. The processor 201 can be a complex instruction set computing (CISC) microprocessor, a reduced instruction set computing (RISC) microprocessor, a very long instruction word (VLIW) microprocessor, a processor implementing a combination of instruction sets, or other processor device. The processor 201 is coupled to a CPU bus 210 which transmits signals between the processor 201 and other components in the computer system 200.

For the illustrated embodiment, a memory 213 comprises a dynamic random access memory (DRAM) device, a static random access memory (SRAM) device, or other memory devices. The memory 213 stores information or other intermediate data during execution by the processor 201. A bridge memory controller 211 is coupled to the CPU bus 210 and the memory 213. The bridge memory controller 111 directs data traffic between the processor 201, the memory 213, and other components in the computer system 200 and bridges signals from these components to a high speed I/O bus 220.

For the illustrated embodiment, the high speed I/O bus 220 supports peripherals operating at high data throughput rates. The bus 220 can be a single bus or a combination of multiple buses. As an example, the bus 220 can comprise a Peripheral Components Interconnect (PCI) bus, a Personal Computer Memory Card International Association (PCMCIA) bus, or other buses. The bus 220 provides communication links between components in the computer system 200. A network controller 221 links a network of computers together and provides communication among the machines. A display device controller 222 is coupled to the high speed I/O bus 220. The display device controller 222 allows coupling of a display device to the computer system and acts as an interface between the display device and the computer system 200. The display device receives information and data from the processor 201 through the display device controller 222 and displays the information and data to the user of the computer system 200.

In the illustrated embodiment, a bus bridge 223 couples the high speed I/O bus 220 to I/O bus 230 and I/O bus 240. The bus bridge 223 comprises a translator to bridge signals between the high speed I/O bus 220 and the I/O bus 230 and the I/O bus 240.

The I/O bus 230 is used for communicating information between peripheral device which operate at lower throughput rates. The I/O bus 230 can be a single bus or a combination of multiple buses. As an example, the bus 230 can comprise an Industry Standard Architecture (ISA) bus, an Extended Industry Standard Architecture (EISA) bus or a Micro Channel Architecture (MCA) bus. The bus 230 provides communication links between components in the computer system 200. A data storage device 231 can be a hard disk drive, a floppy disk drive, a CD-ROM device, a flash memory device or other mass storage device.

I/O bus 240 is a bus having the capability to power devices coupled to it. The I/0 bus 240 can be a single bus or a combination of multiple buses. In one embodiment of the computer system 200, the I/O bus 240 is a USB and bus bridge 223 operate as a host controller to the USB 240. The bus 240 provides communication links between components in the computer system. Component 241 is a USB device coupled to bus 240. The USB device 241 may be for example a video camera, audio speakers, a keyboard controller, an audio controller, or other devices. Suspend control circuit 242 resides inside USB device 241 and operates to support power conservation modes for the USB device 241. It should be appreciated that suspend control circuit 242 may be implemented in devices other than USB devices receiving power from buses other than the USB.

Figure 3:
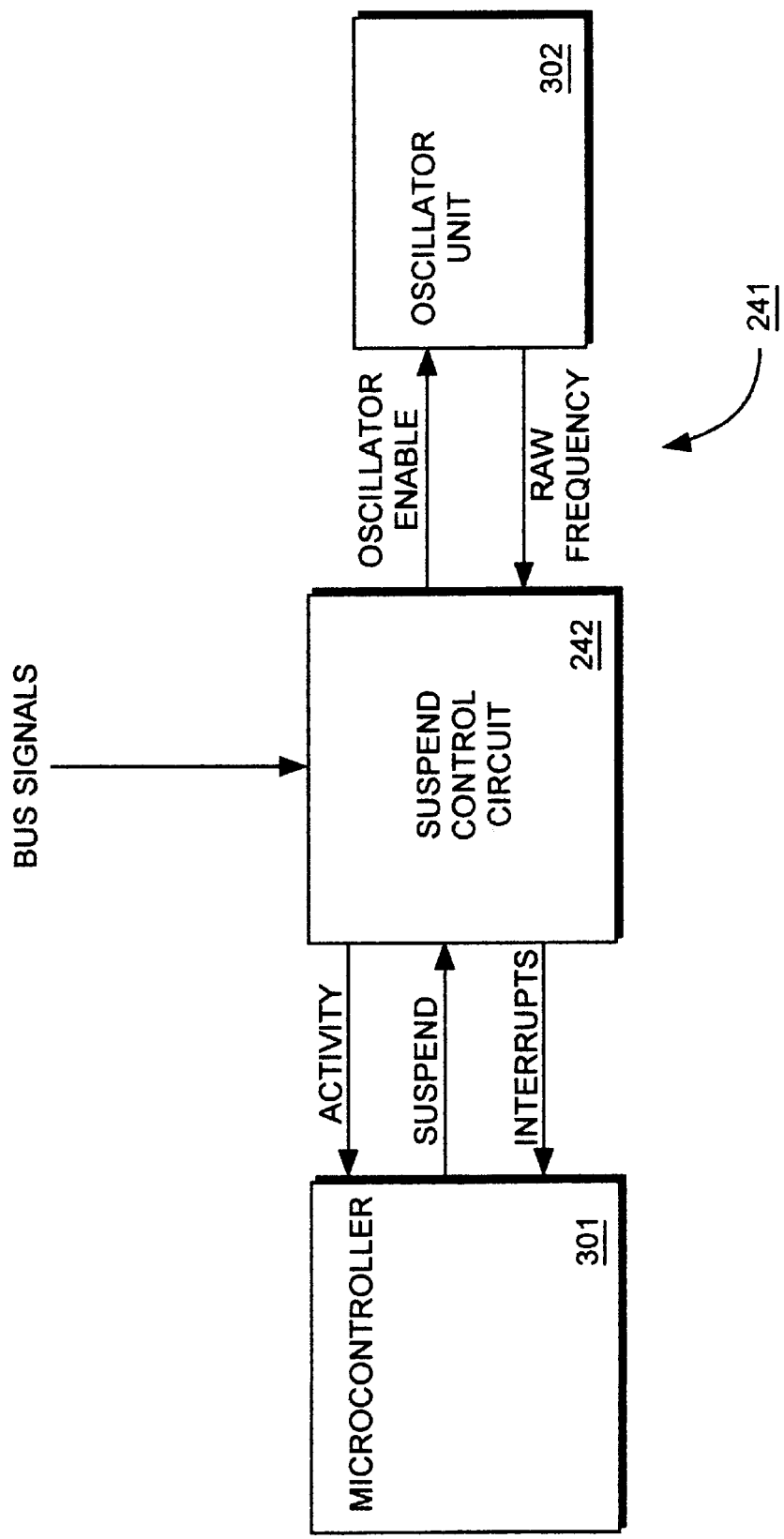
FIG. 3 illustrates a block diagram of an embodiment of a Universal Serial Bus device implementing the present invention.

FIG. 3 is a block diagram of an embodiment of a USB device 241 implementing the present invention. USB device 241 includes a microcontroller circuit 301 that operates to process information and support functions on the USB device 241. A suspend control circuit 242 is coupled to the microcontroller circuit 301. The suspend control circuit 242 operates to support a low power operation mode in the USB device 241. Oscillator unit 302 is coupled to suspend control circuit 242. Oscillator unit 302 operates to provide clocking at a raw frequency to the USB device 241. Oscillator unit 302 includes an oscillator that generates wave forms and a cell that derives clock pulses from the oscillator wave forms. A raw frequency is a frequency generated directly by the oscillator unit 302. Nominal or sub-frequencies are derived from the raw frequency by a clock in the suspend control circuit 242.

The suspend control circuit 242 monitors activity on the USB 240 by detecting a non-idle condition on the USB 240. Suspend control circuit 242 sends an activity signal to microcontroller circuit 301 when the suspend control circuit 242 detects activity on the USB 240. The microcontroller 301 defines a window of time in which it waits for the activity signal from the suspend control circuit 242. If the microcontroller 301 does not receive an activity signal during the window of time, it sends a suspend signal to the suspend control circuit 242 indicating that the USB device 241 should be put into a suspend state. When operating in the suspend state, the USB device 241 reduces its power consumption by disabling the clock in suspend control circuit 242 and oscillator unit 302 in the USB device 241. Disabling the clock in suspend control circuit 242 and oscillator unit 302 puts the USB device 241 in a static state where current consumption comes only from current leakage from the components in the USB device 241.

Suspend control circuit 242 provides a delay to allow USB device state information to be stored before disabling its own clock and oscillator unit 302. Upon receiving the suspend signal from the microcontroller 301, the suspend control circuit 242 activates a time reference circuit residing inside the suspend control circuit 242. After a predetermined period of time, the time reference circuit signals the suspend control circuit 242 to disable the clock and external oscillator unit 302. The time reference circuit is configured to provide an adequate period of time for microcontroller 301 to store state information of the USB device 241 into a memory before disabling the clock and oscillator unit 302. The time reference circuit is time-wise independent of the clock and the oscillator unit 302 in the USB device 241. After the microcontroller 301 has stored the USB device state information in memory, the suspend control circuit 242 disables the clock residing in the suspend control circuit 242. After the clock residing in the suspend control circuit 242 has been disabled, the suspend control circuit 242 disables the oscillator unit 302.

Suspend control circuit 242 continues to monitor the USB 240 while device 241 is in the suspend mode. When activity is detected on the USB 240, the suspend control circuit 242 enters into a resume state. Upon entering the resume state, suspend control circuit 242 enables the oscillator unit 302. Suspend control circuit 242 allows an adequate period of time for the oscillator unit 302 to stabilize before enabling the clock inside suspend control circuit 242. The period of time is measured by the time reference circuit residing in suspend control circuit 242. The time reference circuit is time-wise independent of the clock and the oscillator unit 302 in the USB device 241 and thus provides a reliable timing reference because it does not require time to stabilize. After both the oscillator unit 302 and the clock are enabled, suspend control circuit 242 sends an interrupt signal to microcontroller 301 indicating to microcontroller 301 that resume mode has started and to update the registers in the microcontroller 301 with USB state information stored in memory. After the registers have been updated, suspend control circuit 242 sends a second interrupt signal to microcontroller 301 indicating that the resume mode has ended and to begin normal activity. Microcontroller 301, suspend control circuit 242, and oscillator unit 302 may be implemented by any known circuitry.

Figure 4:
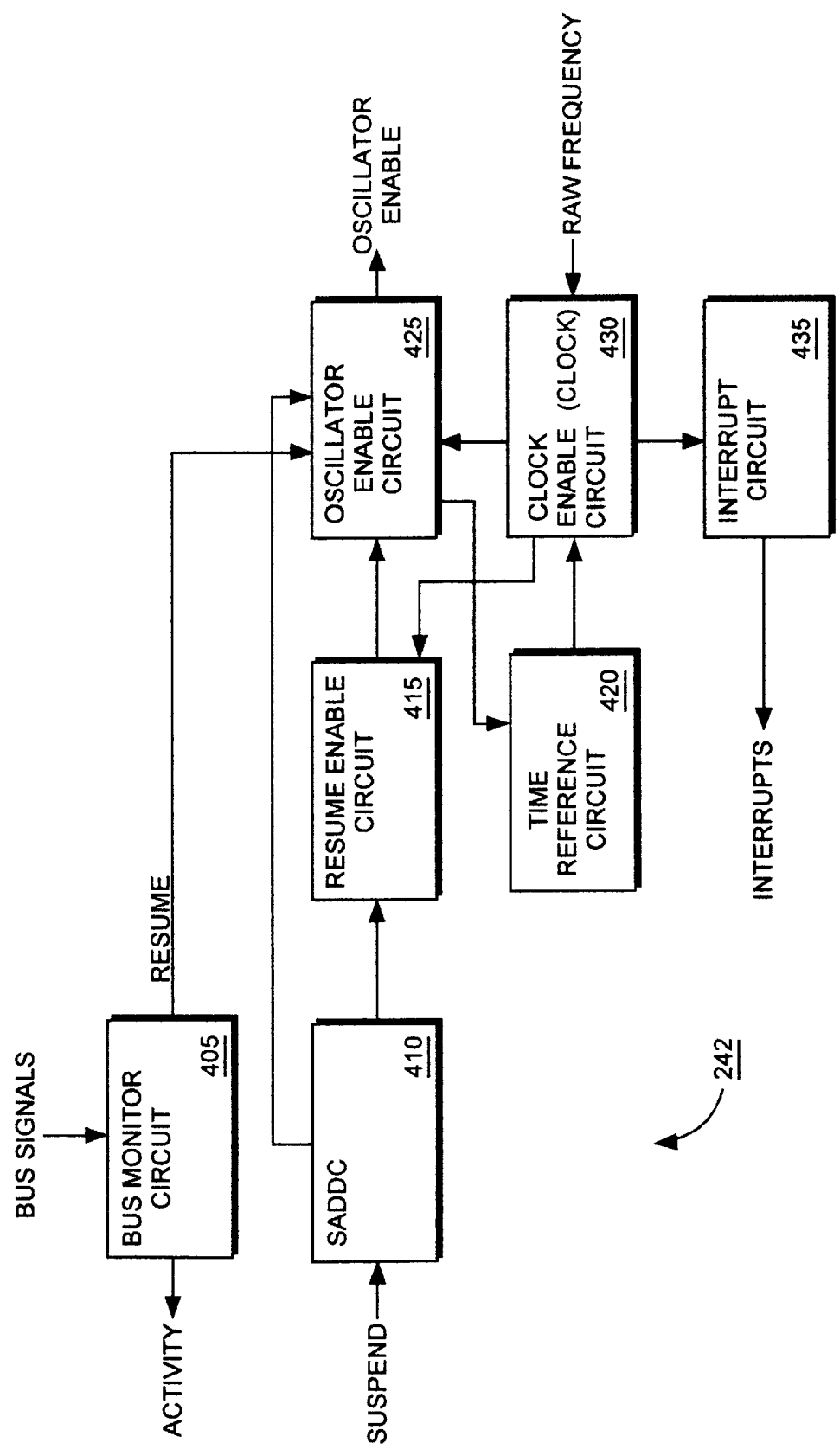
FIG. 4 illustrates a block diagram of an embodiment of the suspend control circuit according to one embodiment of the present invention.

FIG. 4 illustrates a block diagram of an embodiment of the suspend control circuit 242 according to one embodiment of the present invention. Suspend control circuit 242 includes a bus monitor circuit 405. Bus monitor circuit 405 operates to monitor activity on the USB 240 by detecting bus signals on the USB 240. Bus monitoring circuit 405 generates an activity signal or an activity bit when the bus monitoring circuit 405 detects activity on the USB 240. The activity signal is sent to a microcontroller and used by the microcontroller to determine whether or not to put the USB device 241 into a suspend state. When the USB device 241 is in the suspend state, it draws less than a predetermined amount of current, 500 micro amps for the illustrated embodiment, from the USB. This reduction of power consumption is achieved by disabling the clock of suspend control circuit 242 (which for the illustrated embodiment is disposed inside clock enable circuit 430) and the oscillator unit 302 in the USB device. The activity signal is also sent to an oscillator enable circuit 425 which passes a signal to the time reference circuit 420.

Suspend control circuit 242 further includes a suspend assert/deassert detect circuit (SADDC) 410. The SADDC 410 is coupled to the microcontroller 301 and receives a suspend signal from the microcontroller 301 when the microcontroller 301 determines that the USB device 241 should enter the suspend state. The SADDC 410 first drives a signal to the resume enable circuit 415 to block bus activity from prematurely halting the suspend process. The resume enable circuit 415 drives a signal to the oscillator enable circuit 425 indicating that the USB device 241 is to enter the suspend state. The oscillator enable circuit 425 then passes a signal to the time reference circuit 420.

The time reference circuit 420 receives the signal indicating that the USB device 241 is to enter the suspend state from the oscillator enable circuit 410 and provides a delay before disabling the clock in the clock enable circuit 430. The delay allows the microcontroller 301 to store USB device state information into a local memory before the microcontroller 301 enters the suspend mode. In one embodiment of the present invention, the time reference circuit 420 comprises a delay circuit using a resistive-capacitive (R-C) network operating independently time-wise of the clock and oscillator unit 302 on the USB device 241. The resistor and capacitor in the R-C network are configured to provide a delay adequate for allowing the microcontroller to store USB device state information into the memory. The amount of delay required is application dependent and empirically determined.

Figure 5:
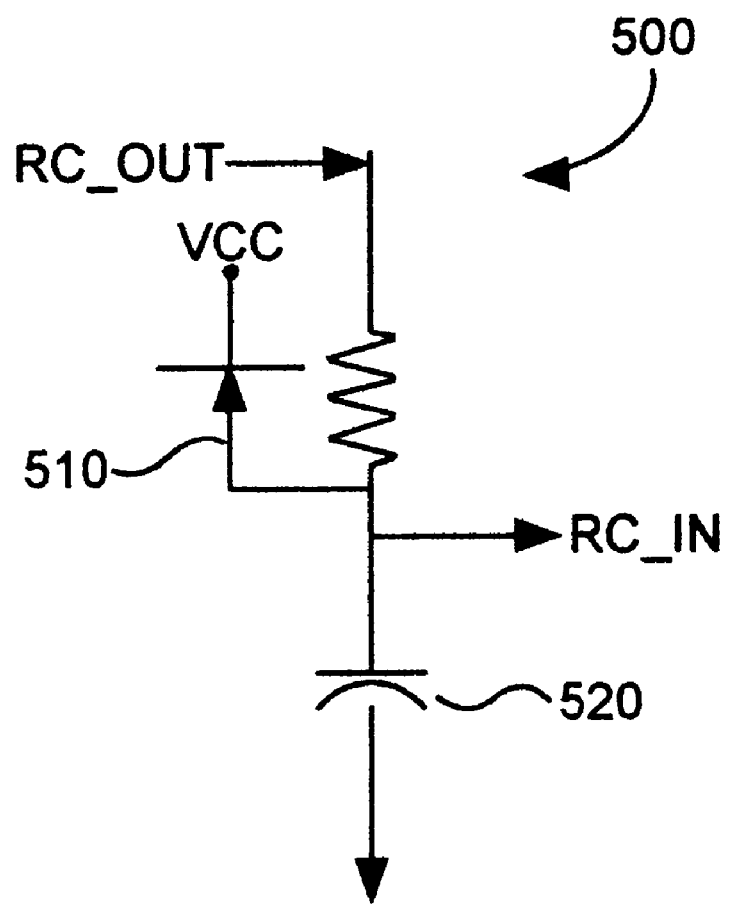
FIG. 5 is one embodiment of an R-C network used in the present invention.

FIG. 5 illustrates one embodiment of an R-C network 500 used in the present invention. The diode 510 is coupled to a supply voltage of the USB device. When no power is applied to the R-C network 500, Vcc and ground are at the same potential and the capacitor 520 is able to discharge through the diode 510. An rc_out signal is used to provide voltage for the capacitor 520 in the R-C network to charge. The rc_in signal is monitored to determine whether the circuit has been charged up. The amount of time to charge up the R-C network is dependent on the values used for the resistor and capacitor components which, as described earlier, are applicant dependent and empirically determined. The R-C network may be used to measure a period of time in both direction whether it is being charged or discharged. After the delay, the time reference circuit 420 drives a signal to the clock enable circuit 430 to indicate that the microcontroller has had time to store USB device state information in memory.

Referring back to FIG. 4, the clock enable circuit 430 includes a clock that derives nominal or sub-frequencies from an oscillator unit 302 external to the suspend control logic 242. The clock enable circuit 430 disables the clock upon receiving a signal from the time reference circuit 420 indicating that the microcontroller has completed storing USB device state information. After a predetermined period of time measured by using the oscillator unit as a reference, clock enable circuit 430 signals oscillator enable circuit 425 to disable the oscillator unit 302. The clock in the clock enable circuit 430 is disabled before disabling the oscillator unit 302. Disabling the clock first prevents the clock from deriving an unstable clock signal from an unstable output of the oscillator unit 302. An unstable clock signal may cause the microcontroller to be put in an invalid state. In one embodiment of the present invention, the predetermined period of time is measured by the raw frequency generated by the oscillator unit 302 and the predetermined period of time is one period defined by the oscillator unit 302.

During the suspend state, bus monitor circuit 405 continues to monitor the activities on the USB 240. Upon detecting activity on the USB 240, bus monitor circuit 405 drives a resume signal to the oscillator enable circuit 425 and the oscillator enable circuit 425 then sends a signal to the time reference circuit 420. The oscillator enable circuit 425 enables the oscillator unit 302 upon receiving the resume signal from the bus monitor circuit 405. The time reference circuit 420 provides a predetermined delay before driving a signal to the clock enable circuit 430 that enables the clock upon receiving the resume signal from the bus monitor circuit 405. The predetermined delay allows the oscillator unit to stabilize before allowing the clock in clock enable circuit 430 to derive nominal or sub-frequencies from the raw frequencies output by oscillator unit 302.

Figure 6:
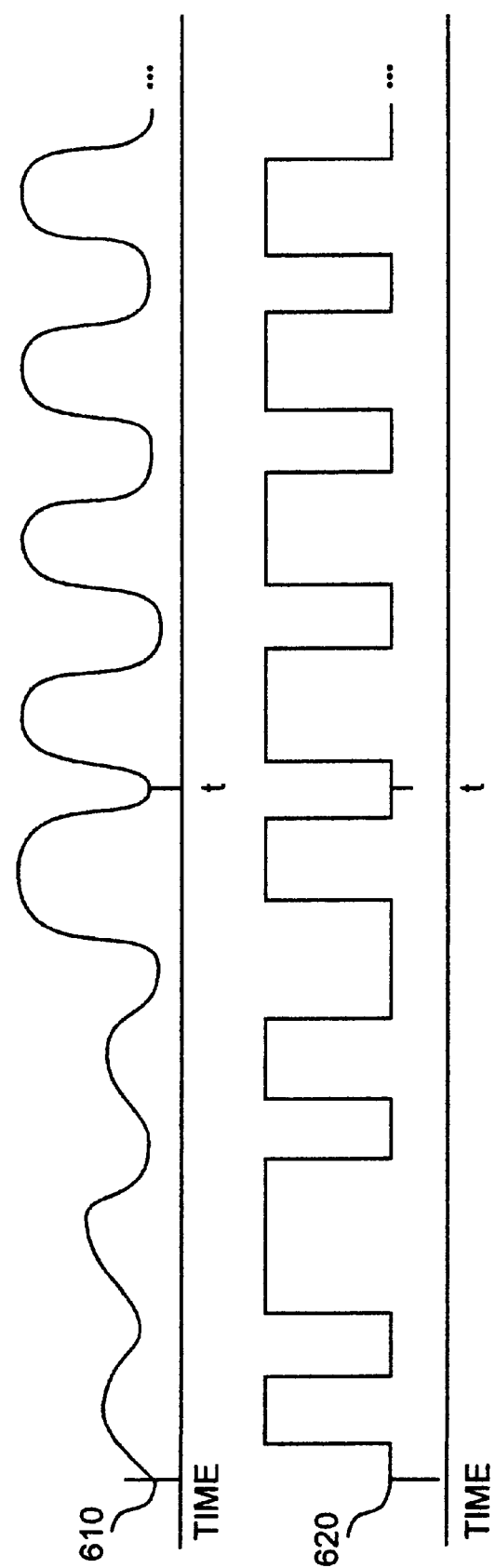
FIG. 6 is diagram illustrating the frequencies generated by an oscillator over time and clock pulses derived from the oscillator frequencies.

FIG. 6 is a diagram illustrating an example of the raw clock frequencies output from an oscillator of oscillator unit 302 over a period of time. Wave form 610 is the output generated from the oscillator. The waves generated by the oscillator from time 0 to time t have amplitude that fluctuate in magnitude. After a time t, the oscillator stabilizes and produces waves having amplitudes that do not fluctuate. Pulse form 620 is the output of a cell of oscillator unit 302 deriving raw frequencies from the wave output of the oscillator. The waves with fluctuating amplitudes generated by the oscillator from time 0 to time t causes the cell to generate imperfect raw frequencies that have unstable frequencies at time 0 to time t. Raw frequencies generated after time t from the waves having amplitudes that do not fluctuate have stable frequencies.

Referring back to FIG. 4, as described eariler, the clock in clock enable circuit 430 is enabled after the oscillator unit 302 has stabilized. Time reference circuit 420 provides a predetermined delay after the oscillator unit 302 has been enabled giving the oscillator unit 302 time to stabilize before enabling the clock in clock enable circuit 430. In one embodiment of the present invention, the time reference circuit 420 utilizes the same R-C network described above for providing the predetermined delay. In an alternate embodiment of the present invention, a different R-C network with a different configuration but still operating in a time-wise independent manner relative to the clock or the oscillator unit 302 is used. The resistor and capacitor in the R-C network are configured to provide a delay adequate for allowing the oscillator unit 302 to stabilize before enabling the clock to derive nominal or sub-frequencies from the raw frequencies output by the oscillator unit 302. Similarly, the amount of delay required is application dependent and empirically determined.

An interrupt circuit 435 is coupled to the clock enable circuit 430 and the microcontroller shown in FIG. 3. After the clock in the clock enable circuit 430 has been enabled, the clock enable circuit 430 drives a resume start signal to the interrupt circuit 435. In response to the resume start signal, interrupt circuit 435 drives a first interrupt to the microcontroller 301. The first interrupt indicates to the microcontroller 301 that the resume state has started and that the USB device state information stored in memory during suspend mode must be written back into the registers in the microcontroller 301. After the USB device 241 state information has been restored back into the registers of the microcontroller 301, the interrupt circuit 435 drives a second interrupt signal to the microcontroller 301, indicating that the resume state has ended and that the USB device 241 is back in a normal operation state. The USB signals the end of resume when both of its lines are driven low for a period of time. The bus monitor circuit 405 sees this condition and drives this second interrupt to the microcontroller 301.

In one embodiment of the present invention, a resume enable circuit 415 is coupled to the SADDC 410, oscillator enable circuit 425, and clock enable circuit 430. Resume enable circuit 415 operates to allow the USB device 241 to complete the steps of entering into the suspend state before allowing the USB device 241 to begin steps for entering into the resume state. SADDC 410 sends a signal to the time reference circuit 420 indicating that the USB device 241 is to enter the suspend state, by way of the resume enable circuit 415. The resume enable circuit 415 drives a signal to oscillator enable circuit 425 and on through to the time reference circuit 420 causing any resume signals from the bus monitoring circuit 405 to be blocked from the oscillator enable circuit 425 and consequently blocked from the time reference circuit 420 also. This allows the USB device 241 to complete the steps for entering into the suspend state without interruption. Once the clock enable circuit 430 receives a signal from the time reference circuit 420, indicating that the microcontroller 301 has completed storing USB state information and is about to enter into the suspend state, the clock enable circuit 430 drives a signal to the resume enable circuit 415. In response, the resume enable circuit 415 drives a signal to the oscillator enable circuit 425 that removes the blocking of the resume signal from the bus monitor circuit 405. In one embodiment of the present invention, the bus monitor circuit 405, SADDC 410, resume enable circuit 415, time reference circuit 420, oscillator enable circuit 425, clock enable circuit 430, and interrupt circuit 435 all reside on a single chip on the same silicon substrate.

The bus monitor circuit 405, SADDC 410, resume enable circuit 415, time reference circuit 420, oscillator enable circuit 425, clock enable circuit 430, and interrupt circuit 435 may be implemented by any known circuitry. It should be appreciated that the suspend control circuit 242 illustrated in FIG. 4 may be implemented in devices other than USB devices that receive power from buses other than the USB.

Figure 7:
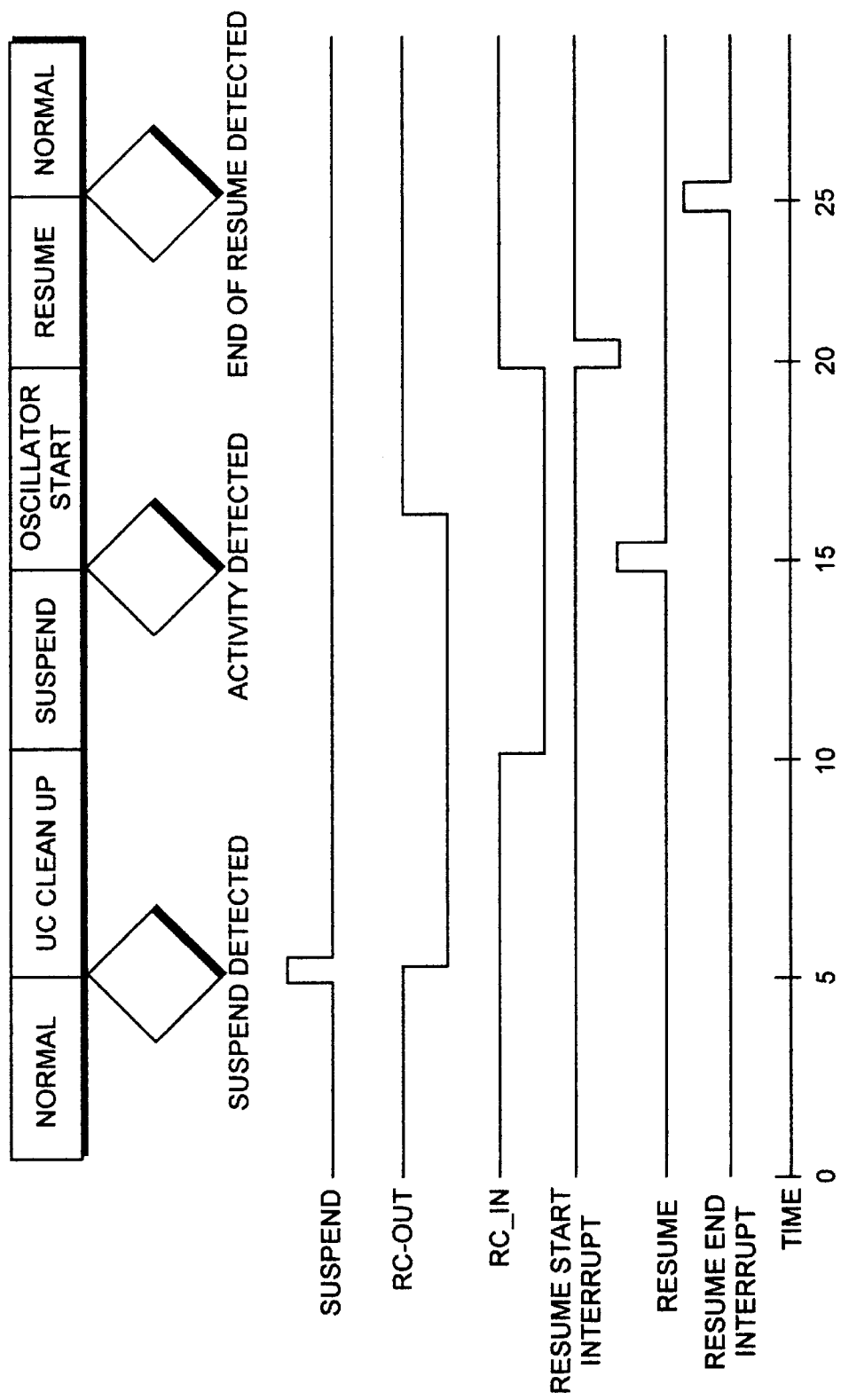
FIG. 7 is a timing diagram illustrating the signals in the suspend control circuit.

FIG. 7 is a timing diagram illustrating the signals in the suspend control circuit. At time 0, the USB device is operating in a normal operation state. At time 5, suspend is detected. The microcontroller sends a suspend pulse to the suspend control circuit after a period of inactivity on the USB. A suspend assert/deassert detect circuit in the suspend control circuit receives the suspend pulse and drives a signal to a time reference circuit in the suspend control circuit. The time reference circuit asserts a signal shown as rc_out through a delay circuit. At time 10, the delay circuit responds by asserting a signal on rc_in. The time period between the assertion of rc_out and rc_in is used by the microcontroller to store USB device state information into memory.

At time 15 activity directed to the USB device is detected by the bus monitoring circuit. Bus monitoring circuit in the suspend control circuit sends a resume pulse to the oscillator enable circuit and time reference circuit by way of oscillator enable circuit. The time reference circuit deasserts the signal shown as rc_out. At time 20, the delay circuit responds by de-asserting a signal on rc_in. The independent time period between the de-assertion of rc_out and rc_in is used as a reference by the clock enable circuit in the suspend control circuit. The clock enable circuit uses this time period as a reference to allow the oscillator unit to stabilize before enabling its clock.

At time 20, a resume start interrupt signal is sent to the microcontroller by an interrupt circuit after the clock has been enabled. The microcontroller responds to the resume start interrupt by writing the USB device state information stored in memory into the registers of the microcontroller. At time 25, a resume end interrupt is sent by the interrupt circuit to the microcontroller. The resume end interrupt informs the microcontroller that the USB device will be running in normal operation mode.

Figure 8:
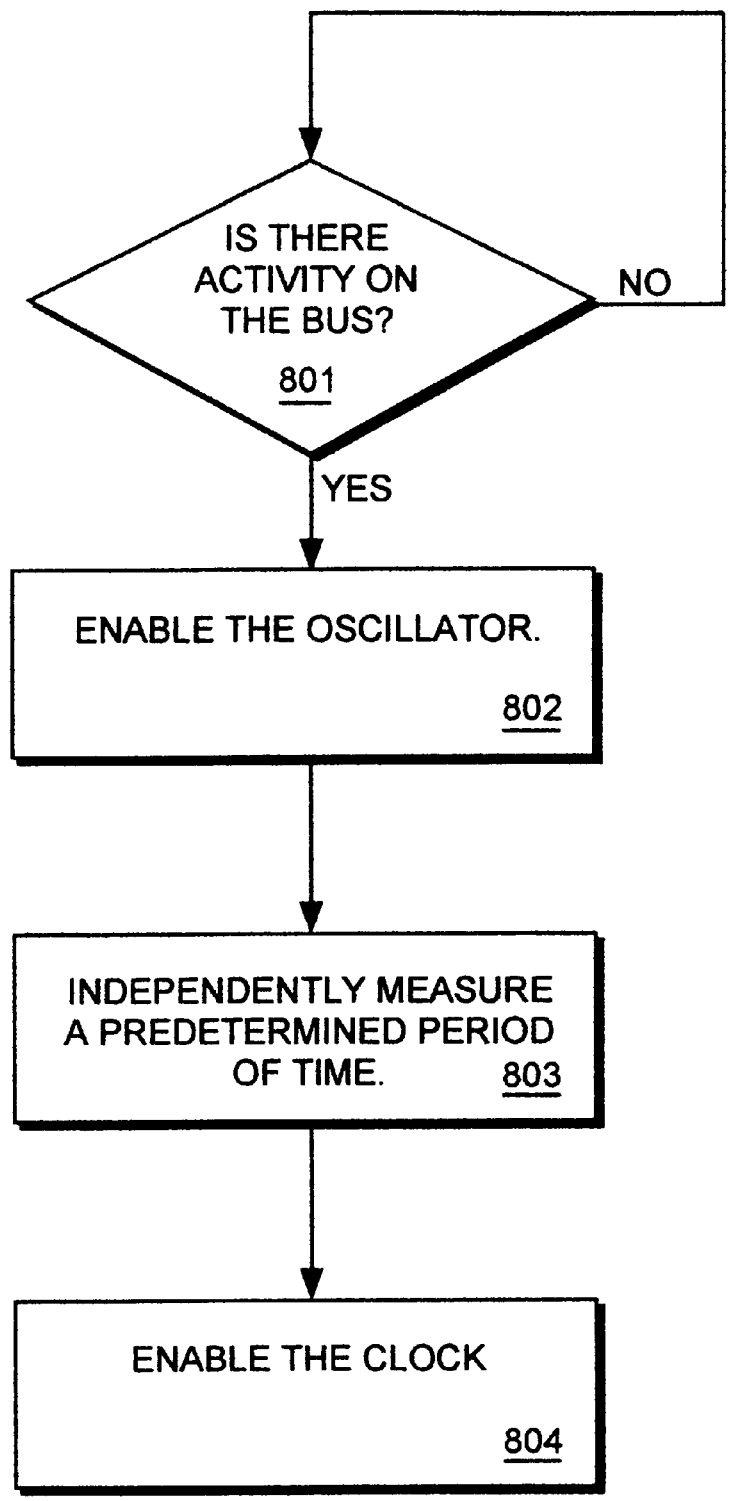
FIG. 8 is a flow chart illustrating a method for supporting power conservation modes in an electronic device receiving power from a bus.

FIG. 8 is a flow chart illustrating a method of exiting a power saving mode for an electronic device powered by a bus. The electronic device operates with an oscillator and a clock deriving a nominal frequency from the oscillator. At step 801, it is determined whether there is activity on the bus directed to the electronic device. If there is no activity on the bus directed to the electronic device, control proceeds to step 801. If there is activity on the bus directed to the electronic device, control proceeds to step 802.

At step 802, the oscillator is enabled.

At step 803, a period of time is independently measured from the time the oscillator is enabled. The measuring is performed by using a time reference that is independent of the oscillator and the clock. In one embodiment of the present invention, the independent measurement is achieved by sending a signal through a delay circuit. The delay circuit could be implemented by using a resistive-capacitive network. The period of time is greater than the time required for the oscillator to stabilize.

At step 804, the clock is enabled after the period of time has expired.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than an restrictive sense.

What is claimed is:

1. A method performed by a suspend control circuit in a peripheral device, the method comprising:

generating an activity signal based on data activity from a host device on a data segment of a bus coupled to the peripheral device;

receiving a suspend signal from a microcontroller within the peripheral device in response to a predetermined period of inactivity on the data segment of the bus based on the activity signal; and initiating a suspend procedure to enter a suspend mode based on the suspend signal, the suspend procedure comprising:

blocking the activity signal to prevent initiation of a resume procedure during the suspend procedure;

storing state information;

disabling a clock a first predetermined period of time after initiating the suspend procedure;

disabling an oscillator a second predetermined period of time after the clock has been disabled; and un-blocking the activity signal.

2. The method of claim 1, further comprising:

initiating the resume procedure from the suspend mode based on the activity signal, the resume procedure comprising:

enabling the oscillator;

enabling the clock a third predetermined period of time after the oscillator has been enabled; and updating the device with the stored state information.

3. The method of claim 2, wherein the third predetermined period of time is measured by sending a signal through an independent clock reference circuit.

4. The method of claim 2, wherein the the independent clock reference circuit comprises a resistive-capacitive network having a time constant.

5. A suspend control circuit in a peripheral device comprising:

a bus monitor circuit to monitor a data segment of a bus coupled to the peripheral device for data activity from a host device, said bus monitor to generate an activity signal when data activity is detected;

a suspend detect circuit to receive a suspend signal from a microcontroller in the peripheral device in response to a period of inactivity indicated by the activity signal, said suspend detect circuit to initiate a suspend procedure based on the suspend signal to enter a suspend mode;

a resume enable circuit to block the activity signal to prevent a resume procedure during the suspend procedure;

a time reference circuit to provide a first delay in response to initiation of the suspend procedure for the peripheral device to save state information;

a clock enable circuit to disable a clock in the peripheral device after the first delay in response to initiation of the suspend procedure; and an oscillator enable circuit to disable an oscillator in the peripheral device after the clock is disabled in response to initiation of the suspend procedure.

6. The suspend control circuit of claim 5, further comprising:

an interrupt circuit to generate an interrupt signal to the microcontroller after the bus monitor circuit detects activity on the data segment of the bus in the suspend mode, the interrupt signal to signal the microcontroller to configure the peripheral device for operation.

7. The suspend control circuit of claim 5, wherein the oscillator enable circuit is to enable the oscillator in response to receiving the activity signal and to initiate a resume procedure from the suspend mode;

wherein the time reference circuit is to provide a second delay in response to initiation of the resume procedure for the oscillator to stabilize; and wherein the clock enable circuit is to enable the clock after the second delay in response to initiation of the resume procedure.

8. The suspend control circuit of claim 5, wherein the time reference circuit comprises a resistor-capacitor network that operates in a time-wise independent manner relative to the oscillator.

9. The suspend control circuit of claim 5, wherein the bus monitor, the suspend detect circuit, the resume enable circuit, the time reference circuit, the oscillator enable circuit, and the clock enable circuit all reside on a same silicon substrate.

* * * * *

UNITED STATES PATENT AND TRADEMARK OFFICE
CERTIFICATE OF CORRECTION

PATENT NO. : 6,085,325
DATED : August 15, 2000
INVENTOR(S) : Jackson et al.

Page 1 of 1

It is certified that error appears in the above-identified patent and that said Letters Patent is hereby corrected as shown below:

Column 9,
Line 34, after "wherein" delete "the"

Signed and Sealed this

Nineteenth Day of March, 2002

Attest:

Attesting Officer

JAMES E. ROGAN
Director of the United States Patent and Trademark Office